(12) United States Patent
Aktas et al.

(10) Patent No.: US 11,910,415 B2
(45) Date of Patent: Feb. 20, 2024

(54) COMBINING CHANNEL BUSY RATIOS RECEIVED FROM MULTIPLE USER EQUIPMENTS

(71) Applicant: QUALCOMM Incorporated, San Diego, CA (US)

(72) Inventors: Tugcan Aktas, La Jolla, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/654,850

(22) Filed: Mar. 15, 2022

(65) Prior Publication Data

US 2022/0346114 A1 Oct. 27, 2022

Related U.S. Application Data

(60) Provisional application No. 63/178,850, filed on Apr. 23, 2021.

(51) Int. Cl.
*H04W 72/52* (2023.01)
*H04W 74/08* (2009.01)
*H04W 72/121* (2023.01)
*H04W 72/54* (2023.01)
*H04W 72/50* (2023.01)
*H04W 72/566* (2023.01)

(52) U.S. Cl.
CPC ......... *H04W 72/52* (2023.01); *H04W 72/121* (2013.01); *H04W 72/535* (2023.01); *H04W 72/54* (2023.01); *H04W 72/569* (2023.01); *H04W 74/0808* (2013.01)

(58) Field of Classification Search
CPC ... H04W 72/02; H04W 72/121; H04W 72/51; H04W 72/52; H04W 72/535; H04W 72/54; H04W 72/569; H04W 74/0808
See application file for complete search history.

(56) References Cited

U.S. PATENT DOCUMENTS

| | | | |
|---|---|---|---|
| 10,917,891 B2* | 2/2021 | Kim | H04W 4/40 |
| 11,178,565 B2* | 11/2021 | Tseng | H04W 40/22 |
| 2019/0239039 A1* | 8/2019 | Hahn | H04W 84/005 |
| 2020/0107330 A1* | 4/2020 | Chae | H04W 72/542 |
| 2020/0145867 A1* | 5/2020 | Tseng | H04B 7/06954 |
| 2020/0229194 A1* | 7/2020 | Belleschi | H04L 5/0064 |
| 2020/0359257 A1* | 11/2020 | Kim | H04W 72/20 |
| 2021/0014893 A1* | 1/2021 | Park | H04W 80/08 |

(Continued)

OTHER PUBLICATIONS

International Search Report and Written Opinion—PCT/US2022/071179—ISA/EPO—dated Jun. 14, 2022.

*Primary Examiner* — Kashif Siddiqui
(74) *Attorney, Agent, or Firm* — Harrity & Harrity, LLP

(57) ABSTRACT

Various aspects of the present disclosure generally relate to wireless communication. In some aspects, a transmitting (Tx) user equipment (UE) may receive, from a plurality of receiving (Rx) UEs, indications of channel busy ratios (CBRs) associated with the plurality of Rx UEs, respectively. The Tx UE may combine the CBRs to obtain a combined CBR associated with the Tx UE. The Tx UE may adjust a resource utilization based at least in part on the combined CBR associated with the Tx UE. Numerous other aspects are described.

26 Claims, 12 Drawing Sheets

(56) References Cited

U.S. PATENT DOCUMENTS

2021/0051653 A1\* 2/2021 Park ................ H04W 72/21
2022/0116942 A1\* 4/2022 Fouad .............. H04W 72/56
2023/0079437 A1\* 3/2023 Ashraf .............. H04W 4/46

\* cited by examiner

COMBINING CHANNEL BUSY RATIOS RECEIVED FROM MULTIPLE USER EQUIPMENTS

CROSS-REFERENCE TO RELATED APPLICATION

This Patent Application claims priority to U.S. Provisional Patent Application No. 63/178,850, filed on Apr. 23, 2021, entitled "COMBINING CHANNEL BUSY RATIOS RECEIVED FROM MULTIPLE USER EQUIPMENTS," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for combining channel busy ratios (CBRs) received from multiple user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication at a transmitting (Tx) UE includes a memory and one or more processors, coupled to the memory, configured to: receive, from a plurality of receiving (Rx) UEs, indications of channel busy ratios (CBRs) associated with the plurality of Rx UEs, respectively; combine the CBRs to obtain a combined CBR associated with the Tx UE; and adjust a resource utilization based at least in part on the combined CBR associated with the Tx UE.

In some aspects, a method of wireless communication performed by a Tx UE includes receiving, from a plurality of Rx UEs, indications of CBRs associated with the plurality of Rx UEs, respectively; combining the CBRs to obtain a combined CBR associated with the Tx UE; and adjusting a resource utilization based at least in part on the combined CBR associated with the Tx UE.

In some aspects, a non-transitory computer-readable medium storing a set of instructions for wireless communication includes one or more instructions that, when executed by one or more processors of a Tx UE, cause the Tx UE to: receive, from a plurality of Rx UEs, indications of CBRs associated with the plurality of Rx UEs, respectively; combine the CBRs to obtain a combined CBR associated with the Tx UE; and adjust a resource utilization based at least in part on the combined CBR associated with the Tx UE.

In some aspects, a Tx apparatus for wireless communication includes means for receiving, from a plurality of Rx apparatuses, indications of CBRs associated with the plurality of Rx apparatuses, respectively; means for combining the CBRs to obtain a combined CBR associated with the Tx apparatus; and means for adjusting a resource utilization based at least in part on the combined CBR associated with the Tx apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
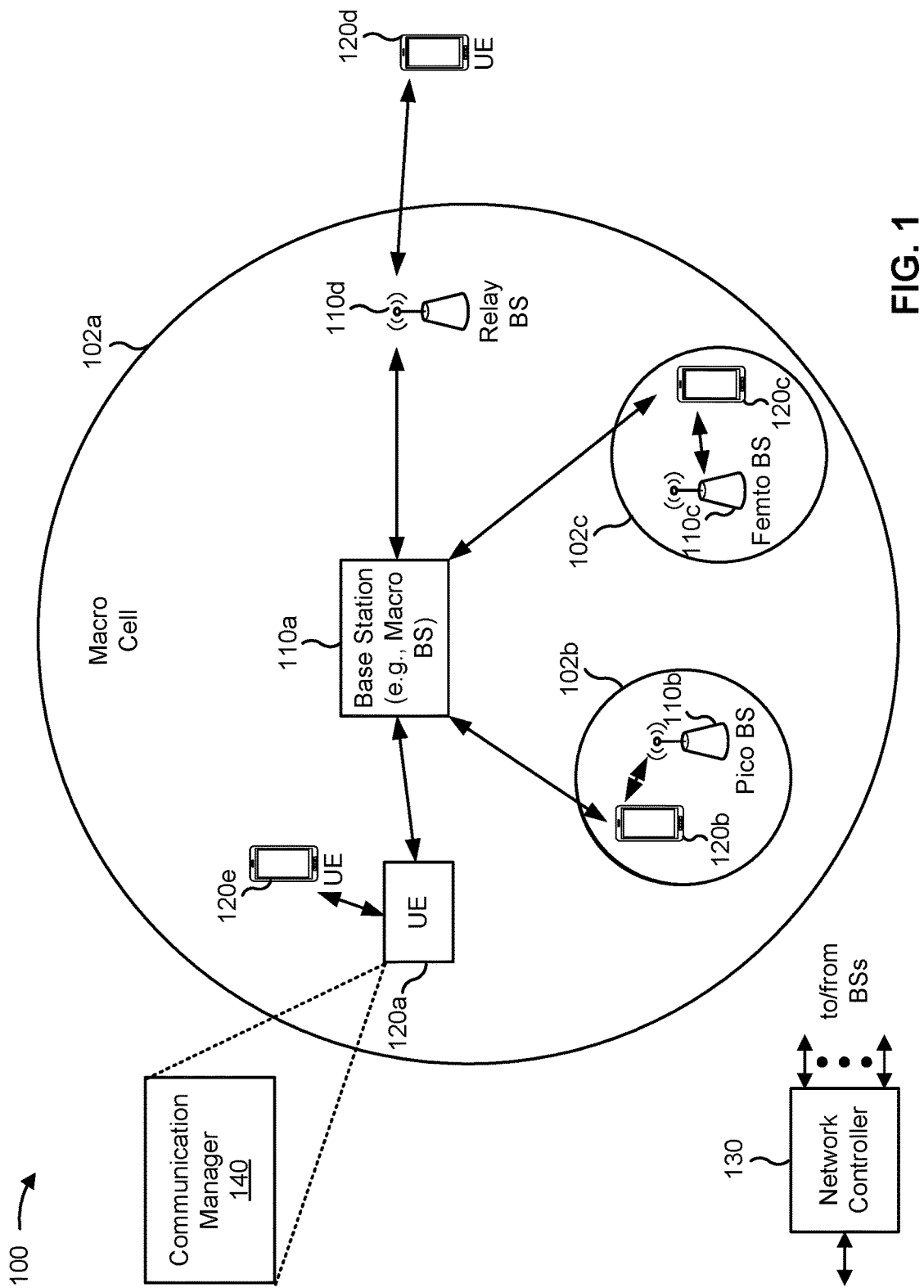
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a Tx UE (e.g., UE 120) may include a communication manager 140. As described in more detail elsewhere herein, the communication manager 140 may receive, from a plurality of Rx UEs, indications of CBRs associated with the plurality of Rx UEs, respectively; combine the CBRs to obtain a combined CBR associated with the Tx UE; and adjust a resource utilization based at least in part on the combined CBR associated with the Tx UE. Additionally, or alternatively, the communication manager 140 may perform one or more other operations described herein.

As indicated above, FIG. 1 is provided as an example. Other examples may differ from what is described with regard to FIG. 1.

Figure 2:
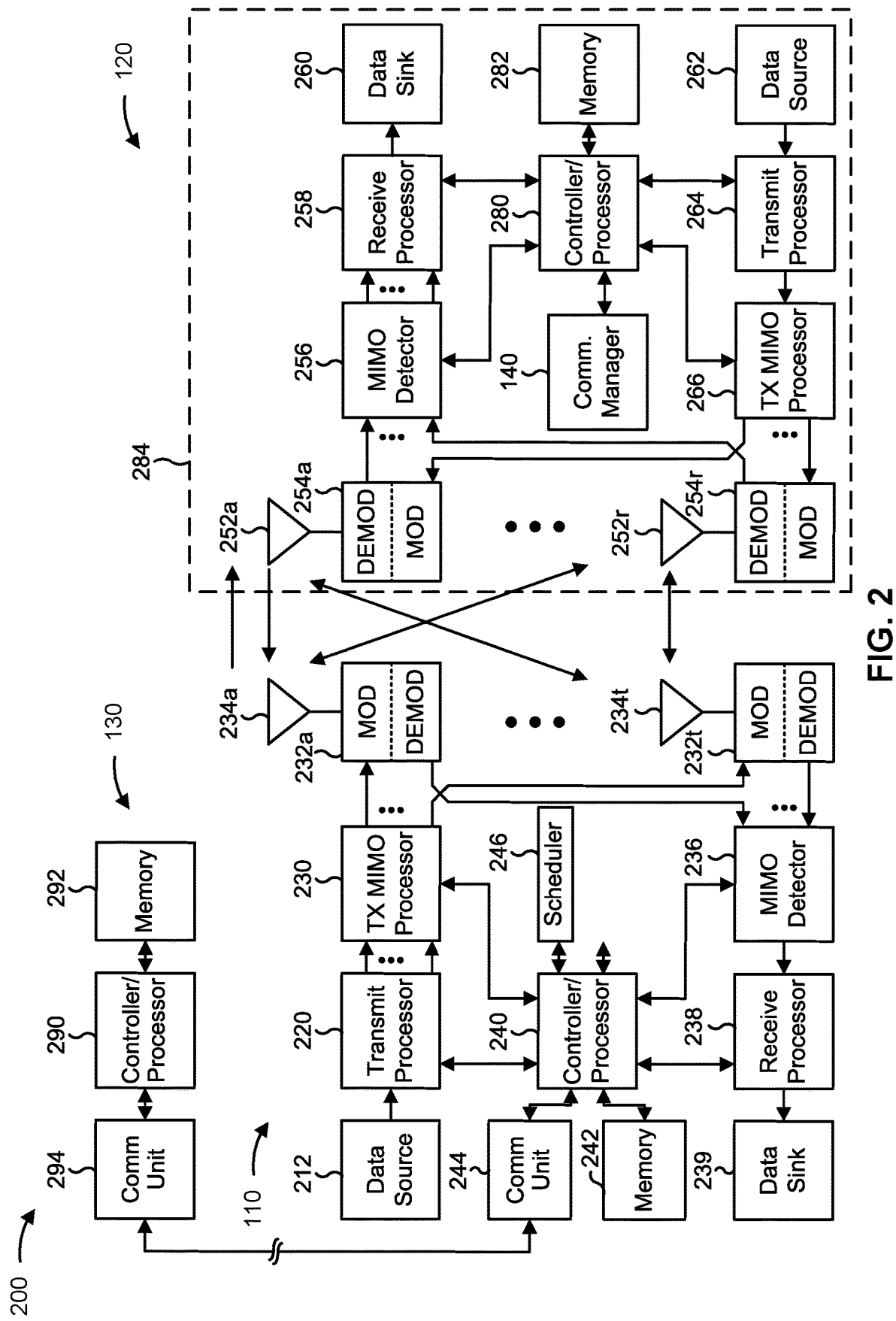
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-11).

The controller/processor 240 of the base station 110, the controller/processor 280 of the UE 120, and/or any other component(s) of FIG. 2 may perform one or more techniques associated with combining CBRs received from multiple UEs, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, and/or other processes as described herein. In some examples, executing instructions may include running the instructions, converting the instructions, compiling the instructions, and/or interpreting the instructions, among other examples.

In some aspects, a Tx UE (e.g., UE 120) includes means for receiving, from a plurality of Rx UEs, indications of CBRs associated with the plurality of Rx UEs, respectively; means for combining the CBRs to obtain a combined CBR associated with the Tx UE; and/or means for adjusting a resource utilization based at least in part on the combined CBR associated with the Tx UE. The means for the Tx UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In NR sidelink, CBR may be a metric used for congestion control. A UE may measure the CBR to determine whether a medium is busy. The UE may measure the CBR based at least in part on sidelink RSSI (S-RSSI) measurements. The UE may limit a resource utilization associated with the UE based at least in part on the CBR. The UE may limit its resource utilization by limiting a channel occupancy ratio (CR) to satisfy a configured threshold. For example, the UE may limit the CR to be smaller than the configured threshold, based at least in part on the measured CBR.

The CBR may be a fraction of sub-channels having an S-RSSI that exceeds a threshold X dBm. The UE may measure the S-RSSI for a plurality of subchannels between [n−100,n−1] to estimate the CBR at slot n.

The CR may be based at least in part on a quantity of subchannels used for transmissions in physical slots in an interval [n−a, n−1] and granted in slots [n, n+b], divided by a plurality of subchannels (e.g., a quantity of all subchannels) in a resource pool over slots in the interval [n−a, n+b] (a+b+1=1000; and a≥500). Further, a is a positive integer, b is a non-negative integer, and n+b may not exceed a last transmission opportunity of a grant for a current transmission.

Figure 3:
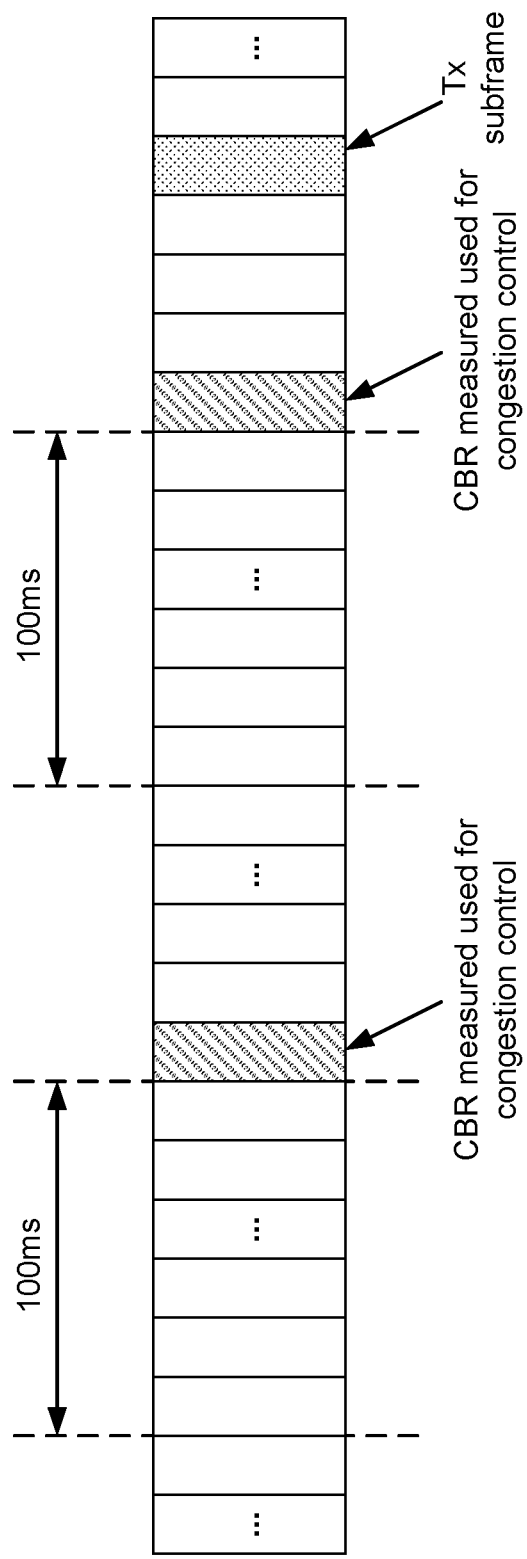
FIG. 3 is a diagram illustrating an example of a channel busy ratio (CBR) measurement, in accordance with the present disclosure.

FIG. 3 is a diagram illustrating an example 300 of a CBR measurement, in accordance with the present disclosure.

As shown in FIG. 3, a CBR may be measured based at least in part on a measurement window. For example, the measurement window may be subframes [n−100, n−1] for the CBR measured at subframe n. The measurement window may be a sliding measurement window, where the CBR may be measured over subframes [n−100, n−1] relative to a transmission on a subframe, which may occur before the subframe n.

As indicated above, FIG. 3 is provided as an example. Other examples may differ from what is described with regard to FIG. 3.

Radio transmission resources may be grouped in transmission pools. Each packet to be transmitted may be associated with a certain priority value (e.g., one of 8 possible priority values), referred to as a ProSe Per Packet Priority (PPPP). A CBR and a CR limit (e.g., a maximum CR limit) may be defined per transmission pool and per PPPP. The CBR limit may be an overall limit on a ratio of utilized resources by a plurality of UEs (e.g., all UEs) in a locality. The CBR and the CR limit may be targets for congestion control. For example, for 0≤CBR measurement≤0.3, no CR limit may apply for PPPP1-PPPP2, PPPP3-PPPP5, and PPPP6-PPPP9. For 0.3<CBR measurement≤0.65, no CR limit may apply for PPPP1-PPPP2, a CR limit of 0.03 may be associated with PPPP3-PPPP5, and a CR limit of 0.02 may be associated with PPPP6-PPPP9. For example, a per-UE resource utilization may be limited to 2% over a one-second interval if the measured CBR is 0.5 for a priority level of one. For 0.65<CBR measurement≤0.8, a CR limit of 0.02 may be associated with PPPP1-PPPP2, a CR limit of 0.006 may be associated with PPPP3-PPPP5, and a CR limit of 0.004 may be associated with PPPP6-PPPP9. For 0.8<CBR measurement≤1, a CR limit of 0.02 may be associated with PPPP1-PPPP2, a CR limit of 0.003 may be associated with PPPP3-PPPP5, and a CR limit of 0.002 may be associated with PPPP6-PPPP9.

In order to limit channel utilization, a UE may measure a plurality of subchannels to obtain an accurate estimate of an instantaneous CBR. With NR sidelink, power sensitive UEs that cannot continuously sense/measure channel resources may be targeted, such that these UEs may still operate with high performance based at least in part on inter-UE coordination. With inter-UE coordination, a reporting of scheduled or available sidelink channel resources may be available for partially-sensing and non-sensing UEs.

A Tx UE (e.g., UE B) may be power-sensitive and may be unable to sense continuously on a plurality of resources for both identifying available resources and estimating the CBR on a sidelink channel. An Rx UE (e.g., UE A) of a unicast/groupcast communication session may perform the sensing and report back an indication of resource availability and an estimated CBR to the TX-UE. The Rx UE may have a greater power capability than the Tx UE. In other words, the Rx UE may be a helping UE with less constraints on power consumption as compared to the Tx UE.

Figure 4:
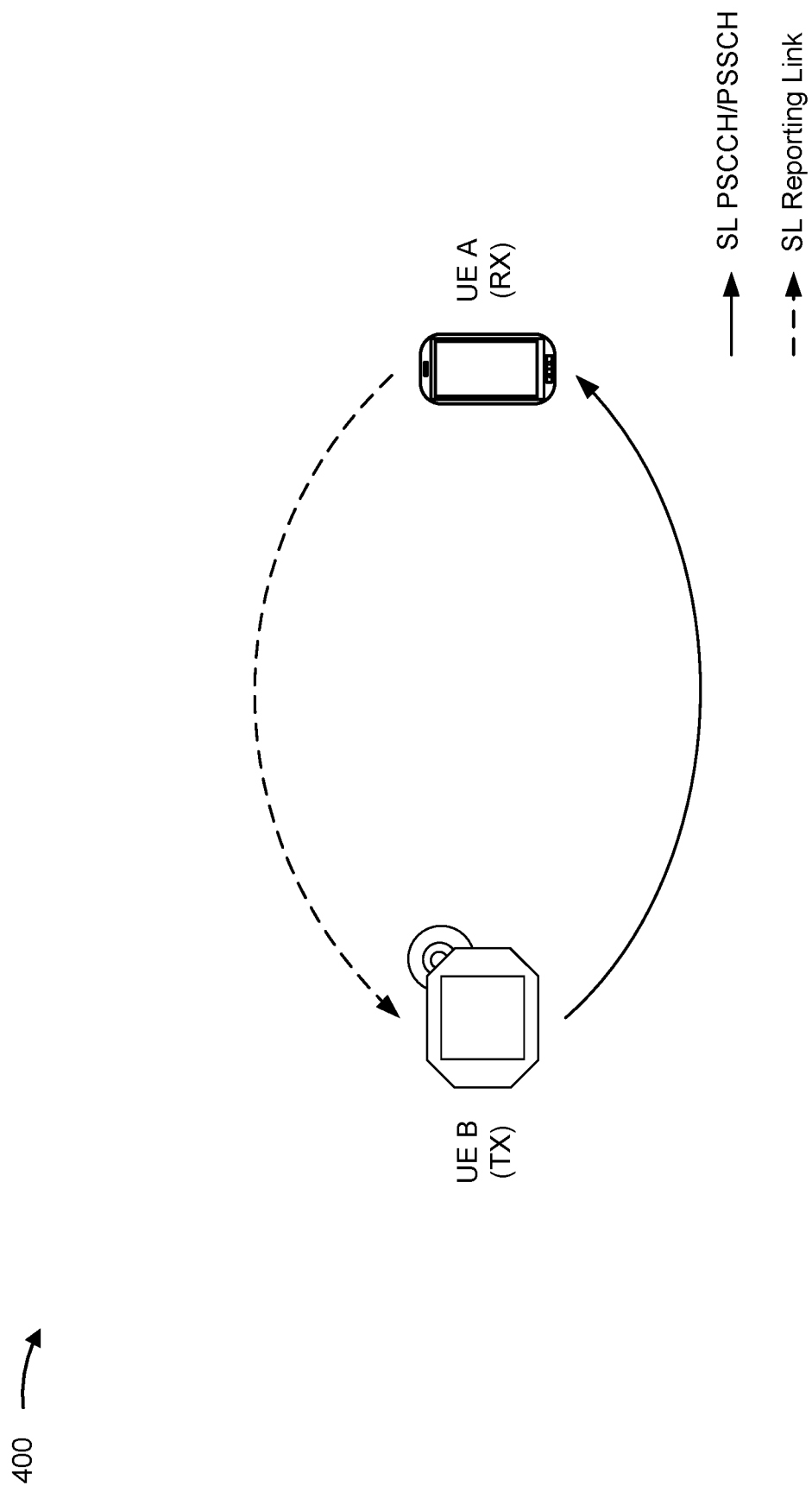
FIG. 4 is a diagram illustrating an example of a sidelink communications, in accordance with the present disclosure.

FIG. 4 is a diagram illustrating an example 400 of a sidelink communications, in accordance with the present disclosure.

As shown in FIG. 4, a Tx UE (e.g., UE B) may perform sidelink communications to an Rx UE (e.g., UE A). The Rx UE may receive the sidelink communications from the Tx UE. For example, the Rx UE may receive the sidelink communications over a sidelink physical sidelink control channel (PSCCH) or a sidelink physical sidelink shared channel (PSSCH). The Rx UE may transmit a report to the Tx UE via a sidelink reporting link between the Rx UE and the Tx UE. The report may indicate a resource availability and an estimated CBR. The Tx UE may receive the report indicating the resource availability and the estimated CBR from the Rx UE.

As indicated above, FIG. 4 is provided as an example. Other examples may differ from what is described with regard to FIG. 4.

Figure 5:
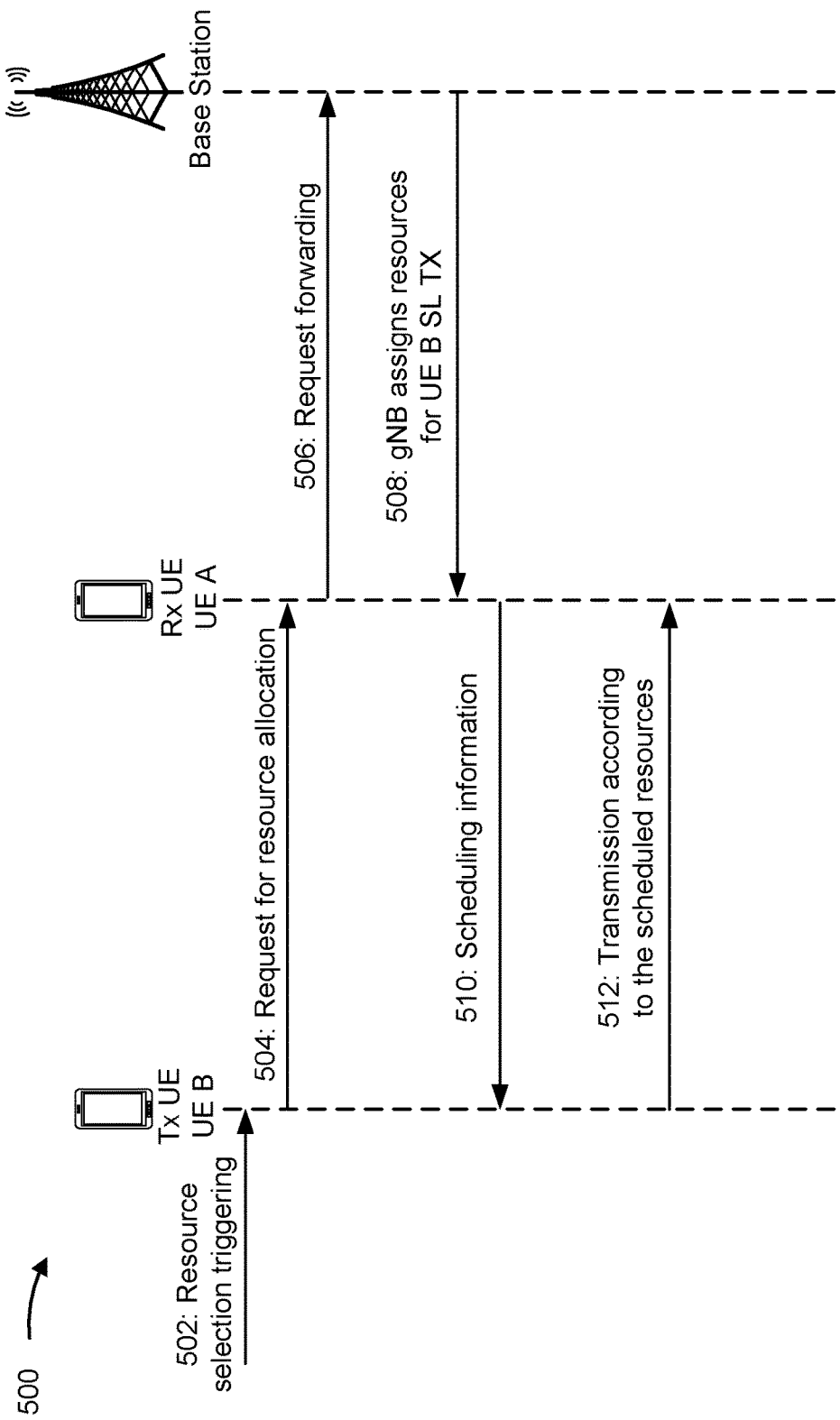
FIG. 5 is a diagram illustrating an example of signaling for a resource allocation, in accordance with the present disclosure.

FIG. 5 is a diagram illustrating an example of 500 signaling for a resource allocation, in accordance with the present disclosure.

As shown by reference number 502, a Tx UE (e.g., UE B) may receive a resource selection trigger. As shown by reference number 504, the Tx UE may transmit, to the Rx UE, a request for a resource allocation based at least in part on the resource selection trigger. As shown by reference number 506, the Rx UE may forward the request to a network entity (e.g., a base station). As shown by reference number 508, the network entity may transmit, to the Rx UE, an indication of assigned resources for a Tx UE sidelink transmission.

As shown by reference number 510, the Rx UE may transmit scheduling information to the Tx UE, where the scheduling information may include the indication of the assigned resources. Further, the scheduling information may indicate a CBR. As a result, the Rx UE may perform measurements for estimating the CBR. As shown by reference number 512, the Tx UE may perform to the Rx UE a sidelink transmission based at least in part on the assigned resources (or scheduled resources).

In some cases, the network entity may not orchestrate the resource allocation, such as in a Mode 2 resource allocation. In this case, the Rx UE may prepare a report for the scheduling information and indicate a subset of available resources. The Rx UE may transmit an indication of the CBR along with the scheduling information. The Tx UE may select from a candidate resource set based at least in part on the indication of the CBR.

As indicated above, FIG. 5 is provided as an example. Other examples may differ from what is described with regard to FIG. 5.

Figure 6:
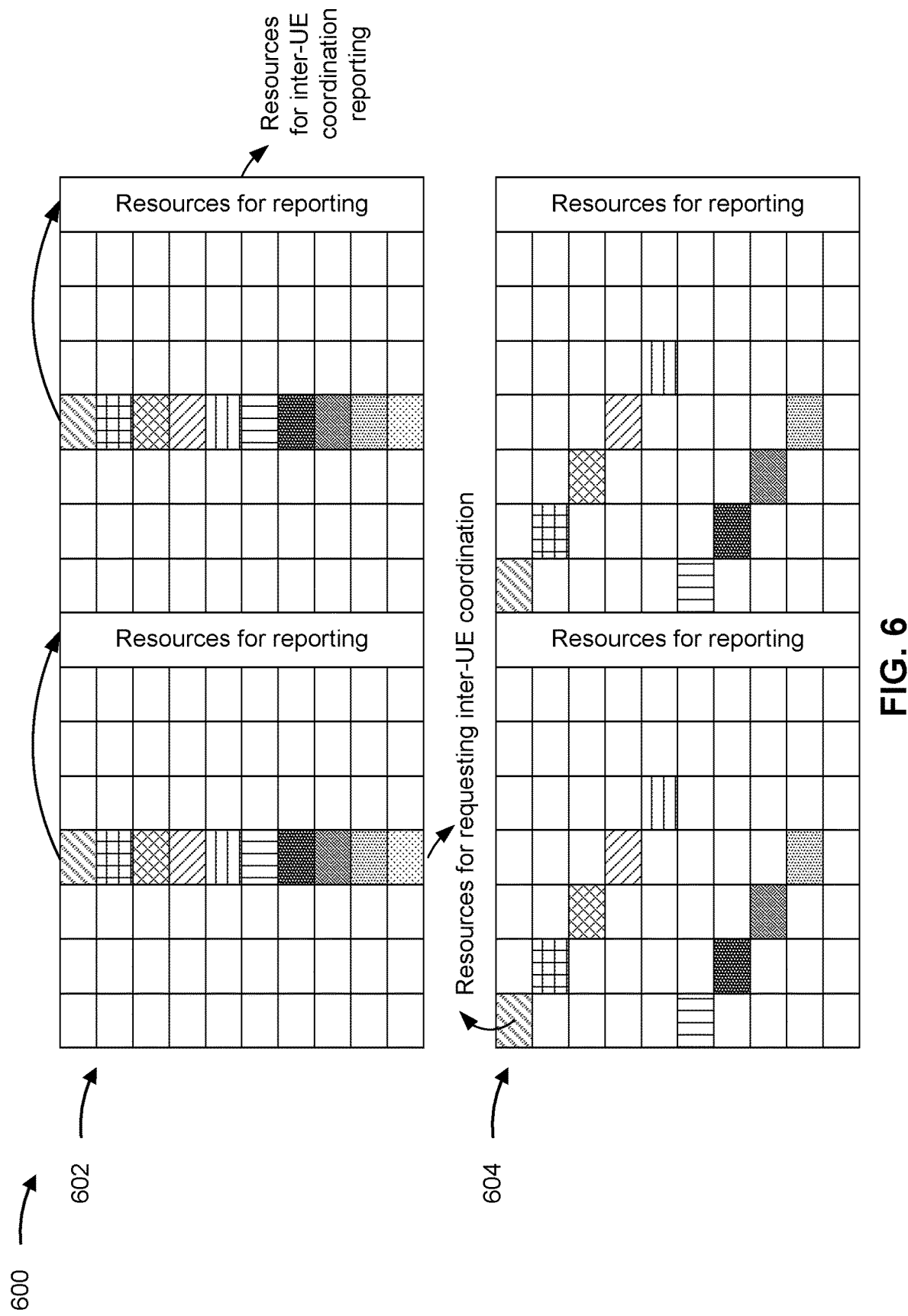
FIG. 6 is a diagram illustrating an example of inter-UE coordination signaling, in accordance with the present disclosure.

FIG. 6 is a diagram illustrating an example 600 of inter-UE coordination signaling, in accordance with the present disclosure.

As shown in FIG. 6, sidelink resources may be configured for transmitting requests for inter-UE coordination and transmitting inter-UE coordination reports. The sidelink resources may be configured with a certain periodicity. The sidelink resources may be configured in one sidelink slot (as shown by reference number 602), or the sidelink resources may be distributed over multiple sidelink slots (as shown by reference number 604). A given sidelink resource (e.g., a request resource for requesting an inter-UE coordination) may be a single sub-channel or multiple sub-channels.

As indicated above, FIG. 6 is provided as an example. Other examples may differ from what is described with regard to FIG. 6.

Figure 7:
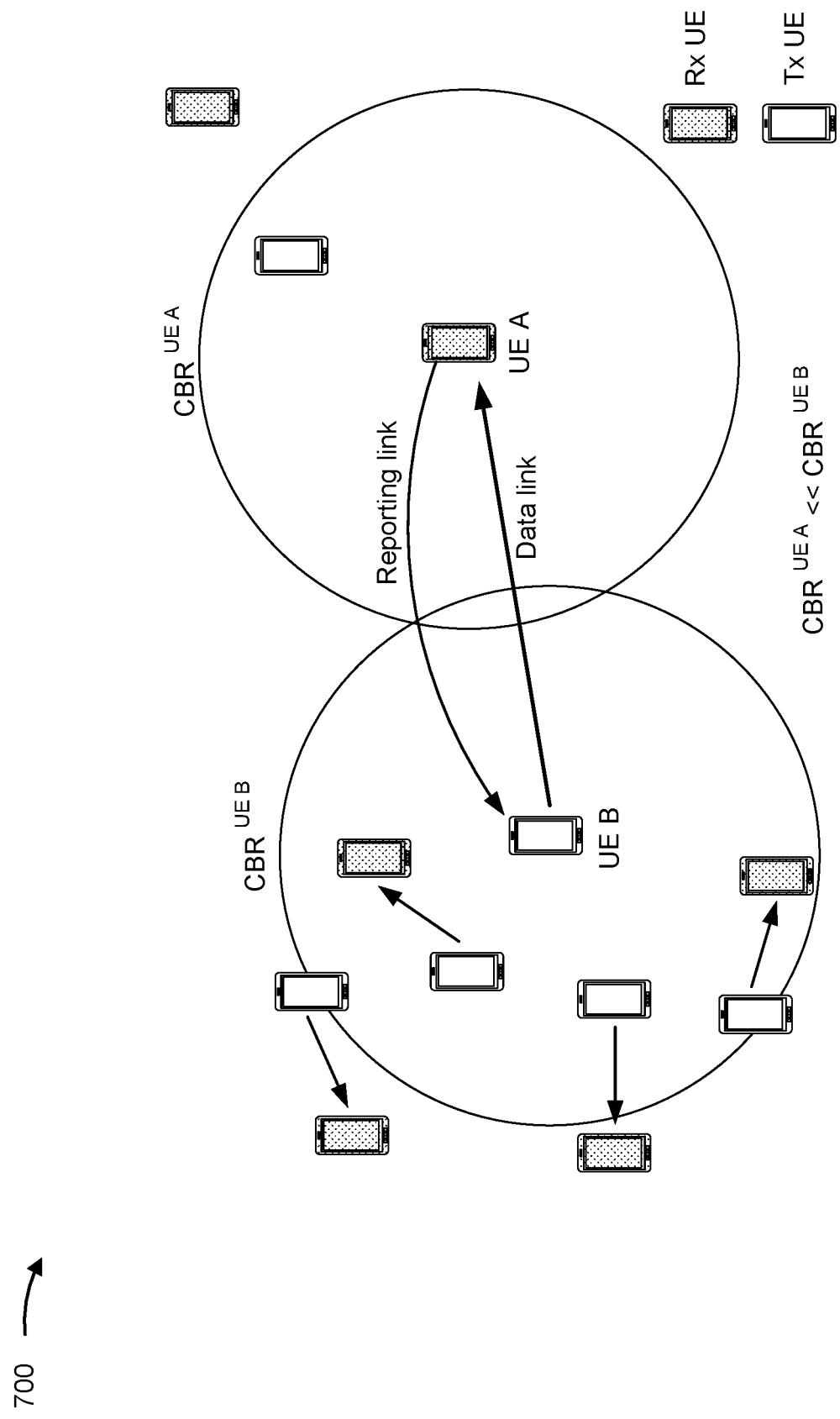
FIG. 7 is a diagram illustrating an example of estimated CBR reporting, in accordance with the present disclosure.

FIG. 7 is a diagram illustrating an example 700 of estimated CBR reporting, in accordance with the present disclosure.

As shown in FIG. 7, UE B may be a Tx UE, and UE A may be an Rx UE. UE A may measure a CBR ($CBR^{UE\ A}$) based at least in part on a locality associated with UE A. UE A may transmit an indication of the measured CBR ($CBR^{UE\ A}$) to UE B. UE B may receive the indication of the measured CBR ($CBR^{UE\ A}$) from a single source (e.g., from UE A), and not from other Rx UEs that are associated with a same locality as UE B. In some cases, an actual CBR of a locality associated with UE B ($CBR^{UE\ B}$) may be different than the measured CBR at UE A ($CBR^{UE\ A}$) (e.g., $CBR^{UE\ A} \ll CBR^{UE\ B}$). As a result, an additional load may be placed on sidelink resources, and possible collisions may reduce a performance level. Alternatively, available sidelink resources may be underutilized, which may increase a latency.

As indicated above, FIG. 7 is provided as an example. Other examples may differ from what is described with regard to FIG. 7.

Since CBR is a local quantity, CBR may vary across a network layout. Although an Rx UE (e.g., a helping UE or a reporting UE) may be a potential receiver for a particular Tx UE, a CBR estimate of the Rx UE may be different than an actual CBR in a locality of the Tx UE. The Rx UE may report the CBR estimate to the Tx UE. In this example, the Tx UE may receive the reported CBR estimate from a single source (e.g., the Rx UE). When the reported CBR estimate is less than the actual CBR in the locality of the Tx UE, an additional load may be placed on sidelink resources, which already may be heavily utilized. As a result, a performance may be degraded based at least in part on collisions on the sidelink resources. When the reported CBR estimate is larger than the actual CBR in the locality of the Tx UE, the Tx UE may drop packets or postpone transmissions. As a result, available sidelink resources may be underutilized and increased latency may occur.

In various aspects of techniques and apparatuses described herein, a Tx UE may receive, from a plurality of Rx UEs, indications of CBRs associated with the plurality of Rx UEs, respectively. For example, the Tx UE may receive at least one indication of a CBR from an Rx UE via a sidelink interface between the Tx UE and the Rx UE. Additionally, or alternatively, the Tx UE may receive the indications of CBRs via broadcasts from the plurality of Rx UEs. The Tx UE may receive the indications of CBRs in inter-UE coordination reports. The Tx UE may be a partially sensing UE or a non-sensing UE, so the Tx UE may receive the inter-UE coordination reports from the plurality of Rx UEs. The Tx UE may combine the CBRs to obtain a combined CBR associated with the Tx UE. The Tx UE may adjust a resource utilization based at least in part on the combined CBR associated with the Tx UE. As a result, the Tx UE may combine a CBR received directly from another Rx UE via a sidelink interface with CBRs overheard via broadcasts from other Rx UEs. The Tx UE may overhear the CBRs via broadcasts and use these CBRs when estimating the CBR associated with the Tx UE. Since the CBR received from the other Rx UE may be associated with a locality that is different than a locality of the Tx UE, which may not provide an accurate representation of a CBR estimate associated with the Tx UE, the Tx UE may utilize overheard CBR estimates from other Rx UEs when estimating the CBR associated with the Tx UE.

Figure 8:
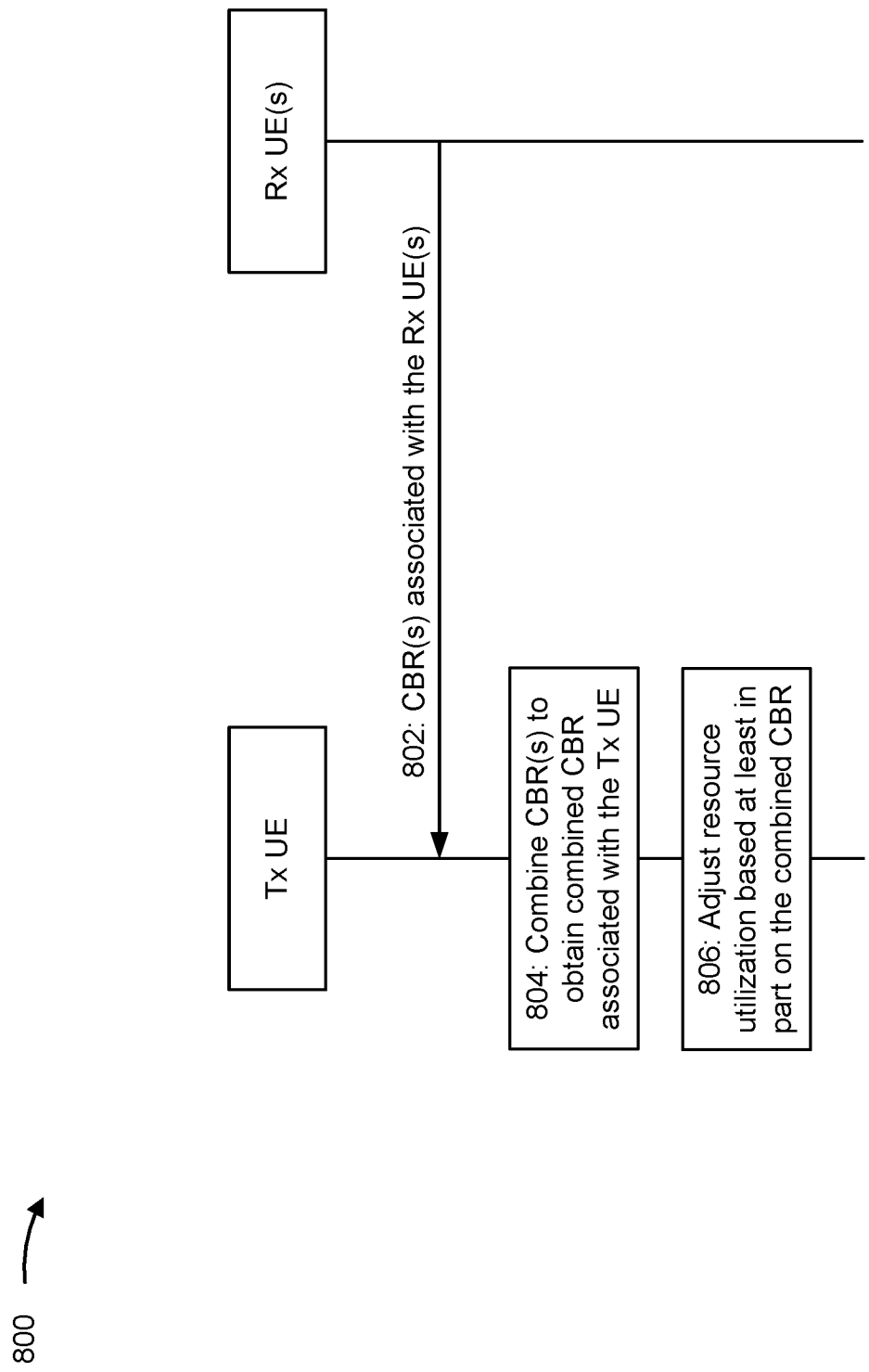
FIGS. 8-10 are diagrams illustrating examples associated with combining CBRs received from multiple UEs, in accordance with the present disclosure.

FIG. 8 is a diagram illustrating an example 800 of combining CBRs received from multiple UEs, in accordance with the present disclosure. As shown in FIG. 8, example 800 includes communication between a Tx UE (e.g., UE 120a) and a plurality of Rx UEs (e.g., UE 120e). In some aspects, the Tx UE and the plurality of Rx UEs may be included in a wireless network such as wireless network 100.

As shown by reference number 802, the Tx UE may receive, from the plurality of Rx UEs, indications of CBRs associated with the plurality of Rx UEs, respectively. The indications of CBRs may be included in inter-UE coordination reports. A received CBR may be a CBR estimate associated with an Rx UE. In some aspects, the Tx UE may receive an indication of a CBR from an Rx UE via a sidelink interface between the Tx UE and the Rx UE. In other words, the Tx UE may receive the indication of the CBR from the Rx UE via a unicast communication. Additionally, or alternatively, the Tx UE may receive indications of CBRs via broadcasts from the plurality of Rx UEs. The indications of CBRs received via broadcasts may be "overheard" CBRs.

In some aspects, the Tx UE may receive the indications of CBRs in slots that precede or succeed a reporting slot associated with the Tx UE. In some aspects, the Tx UE may receive the indications of CBRs in slots that correspond to reporting slots associated with the Tx UE. In other words, the Tx UE may overhear (e.g., via a broadcast) inter-UE coordination reports with CBRs in slots that precede the reporting slot associated with the Tx UE, succeed the reporting slot associated with the Tx UE, and/or overlap with the reporting slot associated with the Tx UE. The reporting slot associated with the Tx UE may be a slot of the Tx UE's own report.

In some aspects, the Tx UE may receive, from a network entity, a configuration that defines a plurality of slots for receiving the indications of CBRs. The configuration may limit a maximum quantity of inter-UE coordination reports with CBRs to be received from the plurality of Rx UEs. The configuration may be based at least in part on a capability of the Tx UE. Further, the plurality of slots may satisfy a threshold level that enables the Tx UE to periodically enter a power saving mode.

In some aspects, the Tx UE may be (pre-)configured or dynamically configured to define the slots for receiving indications of CBRs, and to limit the maximum quantity of inter-UE coordination reports to be overheard (e.g., via broadcasts of the inter-UE coordination reports). The Tx UE may be configured based at least in part on the capability of the Tx UE, in terms of complexity and/or power. Further, the Tx UE may avoid listening for indications of CBRs in a quantity of slots that exceeds a threshold, such that the Tx UE may be able to periodically enter the power saving mode. In other words, the Tx UE may be configured to intermittently overhear indications of CBRs, so that the Tx UE may be able to periodically enter a sleep mode and save power.

In some aspects, the Tx UE may select a subset of CBRs from the CBRs associated with the plurality of Rx UEs. The Tx UE may prefer CBRs associated with Rx UEs that represent a locality of the Tx UE in terms of CBR measurement. Within the subset of CBRs which may be overheard via broadcasts, the Tx UE may use the subset of the CBRs. In some aspects, the Tx UE may select the subset of CBRs based at least in part on signal measurements associated with each CBR in the subset of CBRs. For example, the Tx UE may select the subset based at least in part on a strength of overheard signals using RSRP and/or RSRQ measurements. In some aspects, the Tx UE may select the subset of CBRs based at least in part on estimated distances or pathloss values associated with the Rx UEs. For example, the Tx UE may select the subset based at least in part on an estimated/measured distance and/or pathloss values of the Rx UEs. In some aspects, the Tx UE may select the subset of CBRs based at least in part on zone identifiers associated with the plurality of Rx UEs. Since the Tx UE may prefer the CBRs that represent that locality of the Tx UE, the Tx UE may select the subset of CBRs based at least in part on the signal measurements associated with overheard signals containing the indications of CBRs, the estimated/measured distance and pathloss values associated with the Rx UEs, and/or the zone identifiers associated with the Rx UEs.

As shown by reference number 804, the Tx UE may combine the CBRs to obtain a combined CBR associated with the Tx UE. In other words, the Tx UE may combine the CBRs received from the plurality of Rx UEs to form the combined CBR. In some aspects, the combined CBR may be based at least in part on the subset of CBRs.

In some aspects, the Tx UE may combine the CBRs based at least in part on an arithmetic average or a weighted average of the CBRs. The Tx UE may overhear multiple inter-UE coordination reports with CBRs, and the Tx UE may calculate the combined CBR based at least in part on an arithmetic average of a weighted average of the overheard CBRs. A weighting may be based at least in part on a proximity of the Rx UEs to the Tx UE, which may be defined based at least in part on the signal measurements associated with overheard signals containing the indications of CBRs, the estimated/measured distance and pathloss values associated with the Rx UEs, and/or the zone identifiers associated with the Rx UEs.

In some aspects, the Tx UE may rank the CBRs in an order. The Tx UE may select, from the CBRs ranked in the order, a subset of CBRs. The Tx UE may calculate an average value from the subset of CBRs, where the average value may be an arithmetic average value or a weighted average value. In some aspects, the order may be a descending order, and the subset of CBRs may correspond to a quantity of highest CBRs in the CBRs associated with the plurality of Rx UEs. For example, the Tx UE may rank the CBRs in the descending order, and the Tx UE may use the M highest CBRs with arithmetic/weighted averaging, where M is a defined integer. In some aspects, the order may be an ascending order, and the subset of CBRs may correspond to a quantity of lowest CBRs in the CBRs associated with the plurality of Rx UEs. For example, Tx UE may rank the CBRs in the ascending order, and the Tx UE may use the M lowest CBRs with arithmetic/weighted averaging.

In some aspects, the Tx UE may receive the CBRs from different clusters of Rx UEs. The Tx UE may calculate an average value for each cluster of Rx UEs in the different clusters of Rx UEs. The average value may be an arithmetic average value or a weighted average value. The Tx UE may determine the combined CBR based at least in part on the average value for each cluster of Rx UEs in the different clusters of Rx UEs. For example, the Tx UE may have a view of clusters of Rx UEs in the locality of the Tx UE. In this case, the Tx UE may determine an average value for each cluster of Rx UEs, and then the Tx UE may perform averaging across the clusters of Rx UEs. In other words, a first stage of averaging may be per cluster of Rx UEs, and a second stage of averaging may be across the clusters of Rx UEs. As a result, crowded clusters of Rx UEs may not dominate the combined CBR determined at the Tx UE.

In some aspects, the Tx UE may perform a form of clustering based at least in part on a type of inter-UE coordination message, where the type of inter-UE coordination message may correspond to preferred resources or non-preferred resources. The Tx UE may calculate one CBR for a preferred resource indication type of inter-UE coordination message, and the Tx UE may calculate another CBR for a non-preferred resource indication type of inter-UE coordination message. Then Tx UE may either use only one of the calculation results, or the UE may use a weighted average of the calculation results.

In some aspects, the Tx UE may combine the CBRs based at least in part on a latency requirement of a packet to be transmitted, a priority of the packet, a remaining packet delay budget of the packet, a utilization of hybrid automatic repeat request acknowledgements (HARQ-ACKs) versus blind transmissions by the Tx UE, a cast type (e.g., broadcast, unicast, or groupcast), a reliability requirement of a communication session, a utilization of power control by the Tx UE, and/or a communication range.

In some aspects, when no CBR measurement is available at the Tx UE, the Tx UE may fall back to using a (pre-)configured CBR value, or the Tx UE may perform sensing for estimating the CBR value.

In some aspects, the Tx UE may combine the CBRs received from the plurality of Rx UEs with CBR measurements performed by the Tx UE at CBR measurement occasions to obtain the combined CBR associated with the Tx UE. For example, the Tx UE may be a sensing or partially-sensing Tx UE that is configured with CBR measurement occasions. The Tx UE may be configured with discontinuous reception (DRX) and/or wakeup signals. The Tx UE may determine its own estimate of the CBR, and the Tx UE may combine the estimate of the CBR with overheard CBRs by using a weighted sum.

In some aspects, the Tx UE may filter the CBRs based at least in part on a beam index. In other words, the Tx UE may filter received inter-UE coordination reports with CBRs based on the beam index when multiple beams are used for communication. In some aspects, the Tx UE may combine the CBRs per resource pool or per bandwidth part. For example, when more than one resource pool and/or bandwidth part is defined for the Tx UE, the Tx UE may obtain separate CBR estimates for each resource pool and/or bandwidth part. In some aspects, the Tx UE may combine the CBRs associated with an active component carrier or a plurality of component carriers when the Tx UE is configured with sidelink carrier aggregation. For example, the Tx UE may be configured with sidelink carrier aggregation, and in this case, the Tx UE may determine CBR estimates for active component carriers or for a plurality of component carriers (e.g., all component carriers configured for the Tx UE).

As shown by reference number 806, the Tx UE may adjust a resource utilization based at least in part on the combined CBR associated with the Tx UE. For example, the combined CBR may indicate whether a medium is busy, and based at least in part on the combined CBR, the Tx UE may limit its own resource utilization by limiting a CR to be less than a configured threshold.

As indicated above, FIG. 8 is provided as an example. Other examples may differ from what is described with regard to FIG. 8.

Figure 9:
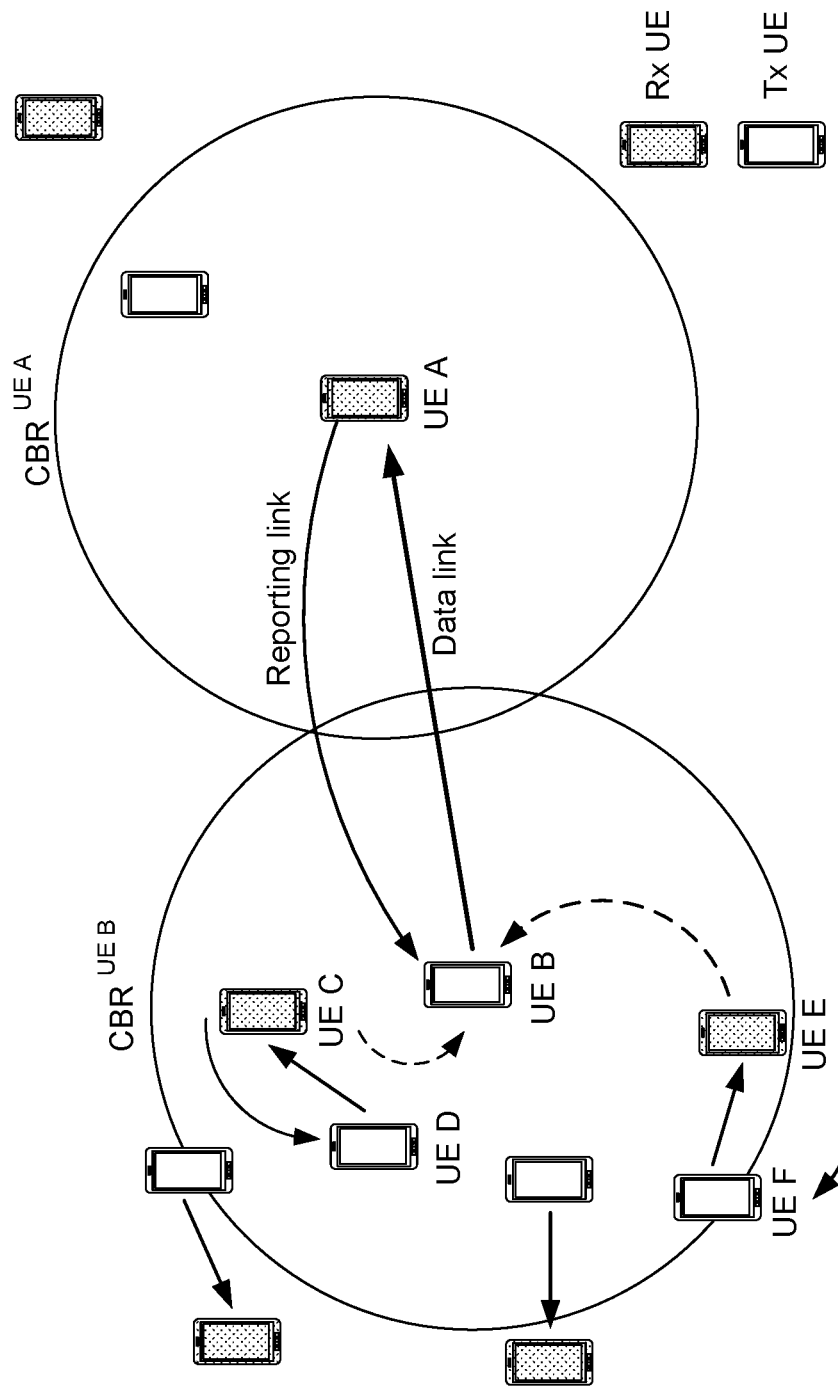

FIG. 9 is a diagram illustrating an example 900 of combining CBRs received from multiple UEs, in accordance with the present disclosure.

As shown in FIG. 9, UE B (a Tx UE) may receive an inter-UE coordination report with a CBR from UE A (an Rx UE). UE A may transmit the inter-UE coordination report with the CBR via a reporting link between UE A and UE B. UE A may transmit a CBR based at least in part on a locality associated with UE A. Further, UE B may receive broadcasts of other inter-UE coordination reports with CBRs from other Rx UEs. For example, UE C and UE E (Rx UEs) may broadcast other inter-UE coordination reports with CBRs to UE D and UE F (Tx UEs), respectively. UE B may overhear the broadcasts of these other inter-UE coordination reports with CBRs. UE C and UE E may broadcast CBRs based at least in part on a locality associated with UE C and UE E, which may correspond to a locality associated with UE B. UE B may combine the CBRs received from UE A, UE C, and UE E to obtain a combined CBR. The combined CBR may be a CBR estimate associated with UE B.

In some aspects, a Tx UE (e.g., UE B) may receive inter-UE coordination reports in slots during which the Tx UE is not in a sleep mode, which may enable the Tx UE to save power. The Tx UE may overhear CBR estimates in inter-UE coordination reports, which may be transmitted via broadcasts. In other words, these inter-UE coordination reports with CBRs may not be intended for the Tx UE, but the Tx UE may be able to detect these inter-UE coordination reports with CBRs. The Tx UE may overhear these inter-UE coordination reports with CBRs on and around report reception slots. The Tx UE may combine overheard CBR estimates from these inter-UE coordination reports to obtain an improved estimation of a CBR associated with the Tx UE, as compared to if the Tx UE only estimated the CBR based at least in part on a received inter-UE coordination report with a CBR from a single source Rx UE (e.g., UE A). An ability to combine CBR estimates from multiple Rx UEs may enable the Tx UE to obtain an estimated CBR with improved accuracy, as some of the Rx UEs may be associated with a locality that does not correspond to a locality of the Tx UE, while other Rx UEs may be associated with the same locality of the Tx UE.

As indicated above, FIG. 9 is provided as an example. Other examples may differ from what is described with regard to FIG. 9.

Figure 10:
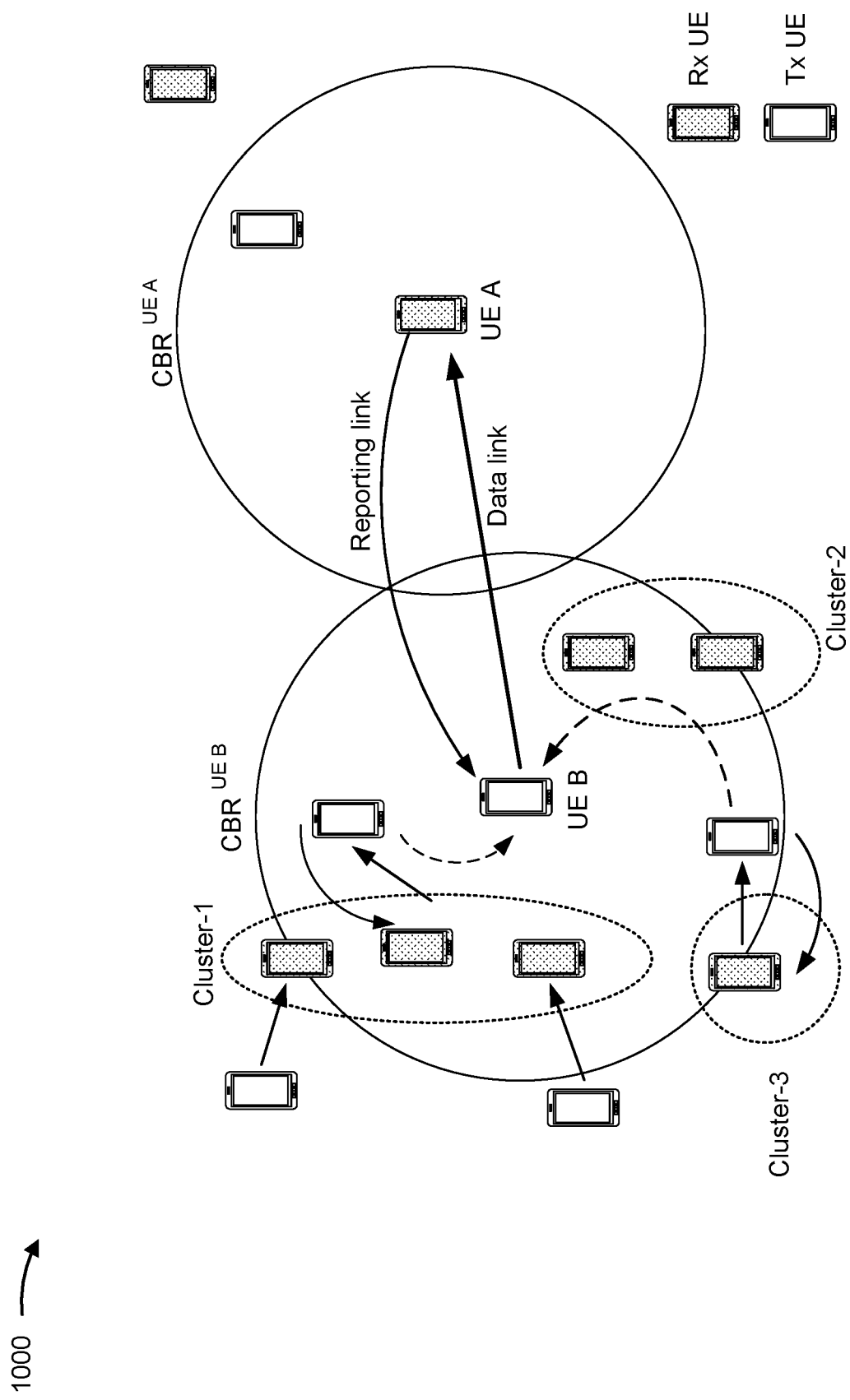

FIG. 10 is a diagram illustrating an example 1000 of combining CBRs received from multiple UEs, in accordance with the present disclosure.

A Tx UE may obtain information on locations of Rx UEs that transmit inter-UE coordination reports with CBR estimates. As a result, the Tx UE may have a view of clusters of Rx UEs. Within clusters of Rx UEs, Rx UEs may tend to yield similar CBR estimates due to a shared locality, and some clusters of Rx UEs may have a relatively large effect on a combined CBR estimate. The Tx UE may calculate an average CBR of each cluster of Rx UEs, and then the Tx UE may calculate an average CBR based at least in part on the average CBR of each cluster of Rx UEs. The Tx UE may perform averaging (e.g., arithmetic averaging and/or weighted averaging) of reported CBRs within clusters of Rx UEs and across the clusters of Rx UEs.

As shown in FIG. 10, a Tx UE (e.g., UE B) may be able to identify a first cluster of Rx UEs (Cluster-1), a second cluster of Rx UEs (Cluster-2), and a third cluster of Rx UEs (Cluster-3) based at least in part on information on locations of the Rx UEs. The Tx UE may determine a first average value associated with the first cluster of Rx UEs. The Tx UE may determine a second average value associated with the second cluster of Rx UEs. The Tx UE may determine a third average value associated with the third cluster of Rx UEs. The Tx UE may determine an average across the first, second, and third clusters of Rx UEs by calculating an average of the first average value, the second average value, and the third average value. In this example, the first cluster may have a relatively large impact if the Tx UE were to take each Rx UE's CBR estimate as a separate input when determining the average of the CBR estimates. As a result, the first average value, the second average value, and the third average value may be associated with separate inputs, as opposed to individual CBR estimates from Rx UEs.

As indicated above, FIG. 10 is provided as an example. Other examples may differ from what is described with regard to FIG. 10.

Figure 11:
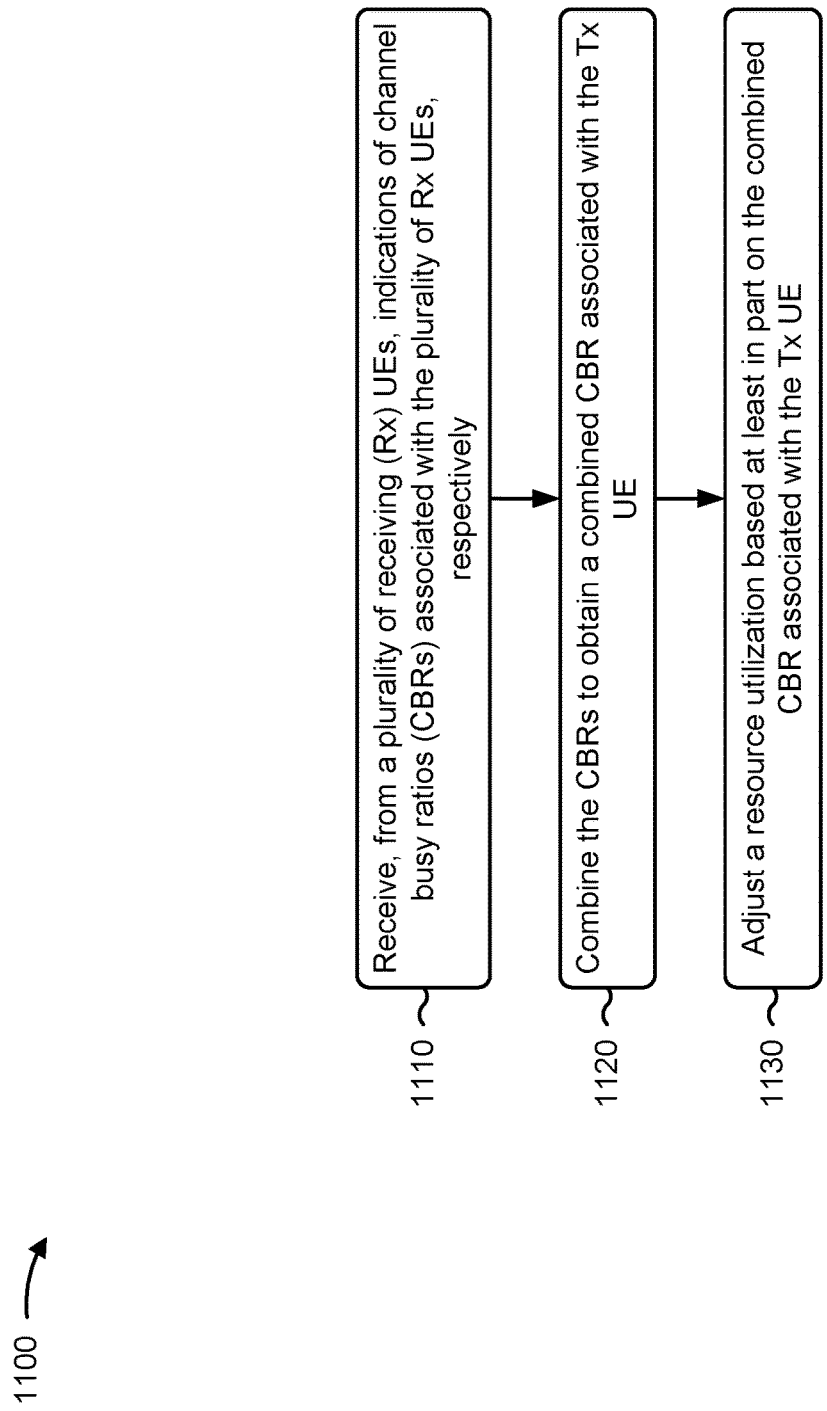
FIG. 11 is a diagram illustrating an example process associated with combining CBRs received from multiple UEs, in accordance with the present disclosure.

FIG. 11 is a diagram illustrating an example process 1100 performed, for example, by a Tx UE, in accordance with the present disclosure. Example process 1100 is an example where the Tx UE (e.g., UE 120) performs operations associated with combining CBRs received from multiple UEs.

As shown in FIG. 11, in some aspects, process 1100 may include receiving, from a plurality of Rx UEs, indications of CBRs associated with the plurality of Rx UEs, respectively (block 1110). For example, the Tx UE (e.g., using reception component 1202, depicted in FIG. 12) may receive, from a plurality of Rx UEs, indications of CBRs associated with the plurality of Rx UEs, respectively, as described above.

As further shown in FIG. 11, in some aspects, process 1100 may include combining the CBRs to obtain a combined CBR associated with the Tx UE (block 1120). For example, the Tx UE (e.g., using combination component 1208, depicted in FIG. 12) may combine the CBRs to obtain a combined CBR associated with the Tx UE, as described above.

As further shown in FIG. 11, in some aspects, process 1100 may include adjusting a resource utilization based at least in part on the combined CBR associated with the Tx UE (block 1130). For example, the Tx UE (e.g., using adjustment component 1210, depicted in FIG. 10) may adjust a resource utilization based at least in part on the combined CBR associated with the Tx UE, as described above.

Process 1100 may include additional aspects, such as any single aspect or any combination of aspects described below and/or in connection with one or more other processes described elsewhere herein.

In a first aspect, process 1100 includes receiving at least one indication of a CBR from an Rx UE via a sidelink interface between the Tx UE and the Rx UE.

In a second aspect, alone or in combination with the first aspect, process 1100 includes the indications of CBRs via broadcasts from the plurality of Rx UEs.

With respect to process 1100, in a third aspect, alone or in combination with one or more of the first and second aspects, the indications of CBRs are included in inter-UE coordination reports.

In a fourth aspect, alone or in combination with one or more of the first through third aspects, process 1100 includes receiving the indications of CBRs in slots that precede or succeed reporting slots associated with the Tx UE.

In a fifth aspect, alone or in combination with one or more of the first through fourth aspects, process 1100 includes receiving the indications of CBRs in slots that correspond to reporting slots associated with the Tx UE.

In a sixth aspect, alone or in combination with one or more of the first through fifth aspects, process 1100 includes receiving, from a network entity, a configuration that defines a plurality of slots for receiving the indications of CBRs.

With respect to process 1100, in a seventh aspect, alone or in combination with one or more of the first through sixth aspects, the configuration limits a maximum quantity of inter-UE coordination reports with CBRs to be received from the plurality of Rx UEs.

With respect to process 1100, in an eighth aspect, alone or in combination with one or more of the first through seventh aspects, the configuration is based at least in part on a capability of the Tx UE.

With respect to process 1100, in a ninth aspect, alone or in combination with one or more of the first through eighth aspects, the plurality of slots satisfy a threshold level that enables the Tx UE to periodically enter a power saving mode.

In a tenth aspect, alone or in combination with one or more of the first through ninth aspects, process 1100 includes selecting a subset of CBRs from the CBRs associated with the plurality of Rx UEs, wherein the combined CBR associated with the Tx UE is based at least in part on the subset of CBRs.

In an eleventh aspect, alone or in combination with one or more of the first through tenth aspects, process 1100 includes selecting the subset of CBRs based at least in part on signal measurements associated with each CBR in the subset of CBRs.

In a twelfth aspect, alone or in combination with one or more of the first through eleventh aspects, process 1100 includes selecting the subset of CBRs based at least in part on one or more of estimated distances or pathloss values associated with the plurality of Rx UEs.

In a thirteenth aspect, alone or in combination with one or more of the first through twelfth aspects, process 1100 includes selecting the subset of CBRs based at least in part on zone identifiers associated with the plurality of Rx UEs.

In a fourteenth aspect, alone or in combination with one or more of the first through thirteenth aspects, process 1100 includes combining the CBRs based at least in part on an arithmetic average or a weighted average of the CBRs.

In a fifteenth aspect, alone or in combination with one or more of the first through fourteenth aspects, process 1100 includes ranking the CBRs in an order, selecting, from the CBRs ranked in the order, a subset of CBRs, and calculating an average value from the subset of CBRs, wherein the average value is an arithmetic average value or a weighted average value.

With respect to process 1100, in a sixteenth aspect, alone or in combination with one or more of the first through fifteenth aspects, the order is a descending order, and the subset of CBRs corresponds to a quantity of highest CBRs in the CBRs associated with the plurality of Rx UEs.

With respect to process 1100, in a seventeenth aspect, alone or in combination with one or more of the first through sixteenth aspects, the order is an ascending order, and the subset of CBRs corresponds to a quantity of lowest CBRs in the CBRs associated with the plurality of Rx UEs.

In an eighteenth aspect, alone or in combination with one or more of the first through seventeenth aspects, process 1100 includes receiving the indications of CBRs from different clusters of Rx UEs, calculating an average value for each cluster of Rx UEs in the different clusters of Rx UEs, wherein the average value is an arithmetic average value or a weighted average value, and determining the combined CBR based at least in part on the average value for each cluster of Rx UEs in the different clusters of Rx UEs.

In a nineteenth aspect, alone or in combination with one or more of the first through eighteenth aspects, process 1100 includes combining the CBRs based at least in part on one or more of a latency requirement of a packet to be transmitted, a priority of the packet, a remaining packet delay budget of the packet, a utilization of hybrid automatic repeat request acknowledgements versus blind transmissions by the Tx UE, a cast type, a reliability requirement of a communication session, a utilization of power control by the Tx UE, or a communication range.

In a twentieth aspect, alone or in combination with one or more of the first through nineteenth aspects, process 1100 includes filtering the CBRs based at least in part on a beam index.

In a twenty-first aspect, alone or in combination with one or more of the first through twentieth aspects, process 1100 includes combining the CBRs received from the plurality of Rx UEs with CBR measurements performed by the Tx UE at CBR measurement occasions to obtain the combined CBR associated with the Tx UE.

In a twenty-second aspect, alone or in combination with one or more of the first through twenty-first aspects, process 1100 includes combining the CBRs per resource pool or per bandwidth part.

In a twenty-third aspect, alone or in combination with one or more of the first through twenty-second aspects, process 1100 includes combining the CBRs associated with an active component carrier or a plurality of component carriers when the Tx UE is configured with sidelink carrier aggregation.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
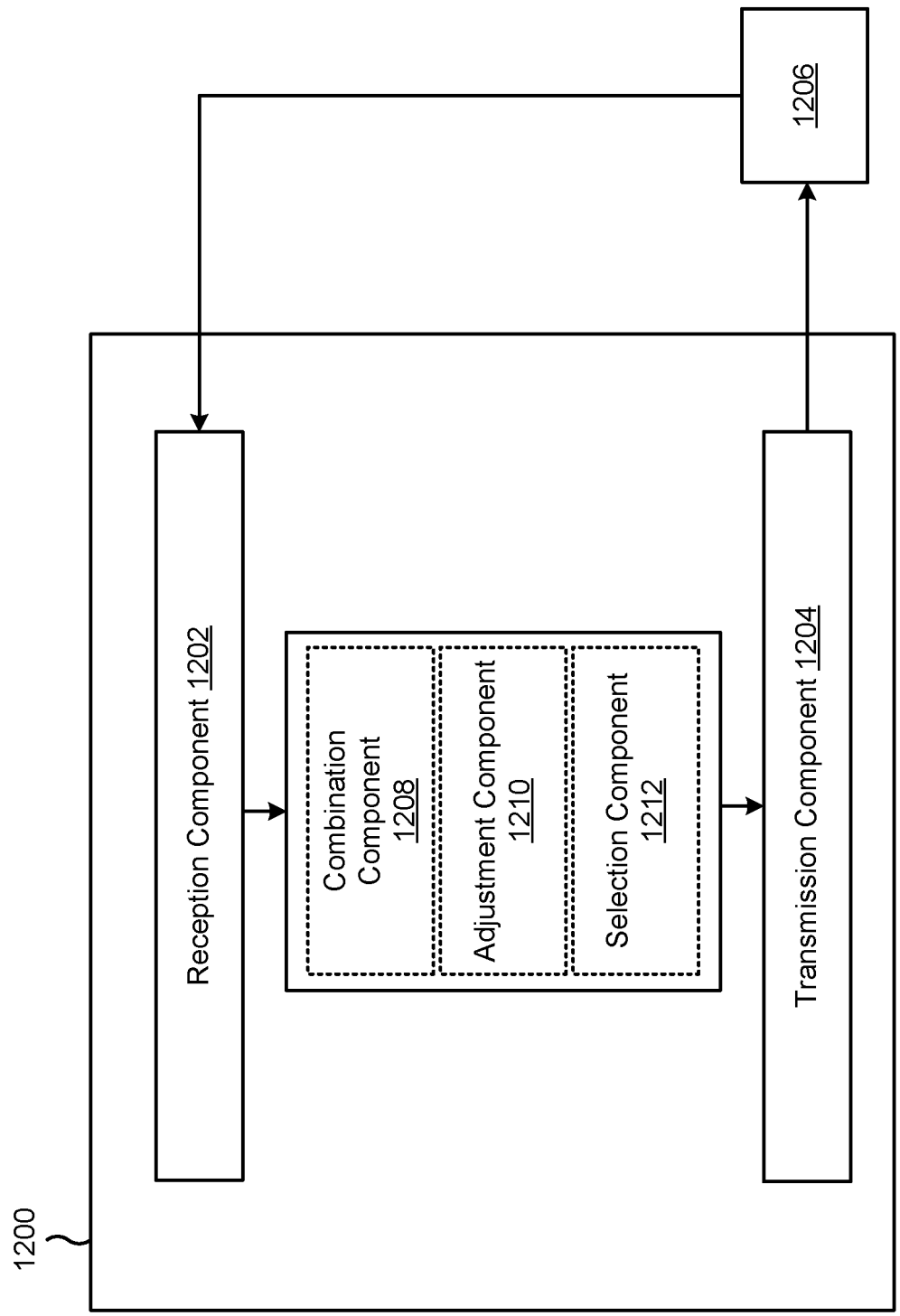
FIG. 12 is a block diagram of an example apparatus for wireless communication, in accordance with the present disclosure.

FIG. 12 is a block diagram of an example apparatus 1200 for wireless communication. The apparatus 1200 may be a Tx UE, or a Tx UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a combination component 1208, an adjustment component 1210, or a selection component 1212, among other examples.

In some aspects, the apparatus 1200 may be configured to perform one or more operations described herein in connection with FIGS. 8-10. Additionally, or alternatively, the apparatus 1200 may be configured to perform one or more processes described herein, such as process 1100 of FIG. 11. In some aspects, the apparatus 1200 and/or one or more components shown in FIG. 12 may include one or more components of the Tx UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the Tx UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the Tx UE described above in connection with FIG. 2. In some aspects, the transmission component 1204 may be co-located with the reception component 1202 in a transceiver.

The reception component 1202 may receive, from a plurality of Rx UEs, indications of CBRs associated with the plurality of Rx UEs, respectively. The combination component 1208 may combine the CBRs to obtain a combined CBR associated with the Tx UE. The adjustment component 1210 may adjust a resource utilization based at least in part on the combined CBR associated with the Tx UE.

The reception component 1202 may receive at least one indication of a CBR from an Rx UE via a sidelink interface between the Tx UE and the Rx UE. The reception component 1202 may receive the indications of CBRs via broadcasts from the plurality of Rx UEs. The reception component 1202 may receive the indications of CBRs in slots that precede or succeed reporting slots associated with the Tx UE. The reception component 1202 may receive the indications of CBRs in slots that correspond to reporting slots associated with the Tx UE. The reception component 1202 may receive, from a base station, a configuration that defines a plurality of slots for receiving the indications of CBRs.

The selection component 1212 may select a subset of CBRs from the CBRs associated with the plurality of Rx UEs. The selection component 1212 may select the subset of CBRs based at least in part on signal measurements associated with each CBR in the subset of CBRs. The selection component 1212 may select the subset of CBRs based at least in part on one or more of estimated distances or pathloss values associated with the plurality of Rx UEs. The selection component 1212 may select the subset of CBRs based at least in part on zone identifiers associated with the plurality of Rx UEs.

The combination component 1208 may combine the CBRs based at least in part on an arithmetic average or a weighted average of the CBRs. The combination component 1208 may rank the CBRs in an order; select, from the CBRs ranked in the order, a subset of CBRs; and calculate an average value from the subset of CBRs.

The reception component 1202 may receive the indications of CBRs from different clusters of Rx UEs. The combination component 1208 may combine the CBRs to obtain the combined CBR. The combination component 1208 may calculate an average value for each cluster of Rx UEs in the different clusters of Rx UEs. The combination component 1208 may determine the combined CBR based at least in part on the average value for each cluster of Rx UEs in the different clusters of Rx UEs.

The combination component 1208 may combine the CBRs received from the plurality of Rx UEs with CBR measurements performed by the Tx UE at CBR measurement occasions to obtain the combined CBR associated with the Tx UE. The combination component 1208 may combine the CBRs per resource pool or per bandwidth part. The combination component 1208 may combine the CBRs associated with an active component carrier or a plurality of component carriers when the Tx UE is configured with sidelink carrier aggregation.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a transmitting (Tx) user equipment (UE), comprising: receiving, from a plurality of receiving (Rx) UEs, indications of channel busy ratios (CBRs) associated with the plurality of Rx UEs, respectively; combining the CBRs to obtain a combined CBR associated with the Tx UE; and adjusting a resource utilization based at least in part on the combined CBR associated with the Tx UE.

Aspect 2: The method of Aspect 1, wherein receiving the indications of CBRs comprises receiving at least one indication of a CBR from an Rx UE via a sidelink interface between the Tx UE and the Rx UE.

Aspect 3: The method of any of Aspects 1 through 2, wherein receiving the indications of CBRs comprises receiving the indications of CBRs via broadcasts from the plurality of Rx UEs.

Aspect 4: The method of any of Aspects 1 through 3, wherein the indications of CBRs are included in inter-UE coordination reports.

Aspect 5: The method of any of Aspects 1 through 4, wherein receiving the indications of CBRs comprises receiving the indications of CBRs in slots that precede or succeed reporting slots associated with the Tx UE.

Aspect 6: The method of any of Aspects 1 through 5, wherein receiving the indications of CBRs comprises receiving the indications of CBRs in slots that correspond to reporting slots associated with the Tx UE.

Aspect 7: The method of any of Aspects 1 through 6, further comprising: receiving, from a network entity, a configuration that defines a plurality of slots for receiving the indications of CBRs.

Aspect 8: The method of Aspect 7, wherein the configuration limits a maximum quantity of inter-UE coordination reports with CBRs to be received from the plurality of Rx UEs.

Aspect 9: The method of Aspect 7, wherein the configuration is based at least in part on a capability of the Tx UE.

Aspect 10: The method of Aspect 7, wherein the plurality of slots satisfy a threshold level that enables the Tx UE to periodically enter a power saving mode.

Aspect 11: The method of any of Aspects 1 through 10, further comprising: selecting a subset of CBRs from the CBRs associated with the plurality of Rx UEs, wherein the combined CBR associated with the Tx UE is based at least in part on the subset of CBRs.

Aspect 12: The method of Aspect 11, wherein selecting the subset of CBRs comprises selecting the subset of CBRs based at least in part on signal measurements associated with each CBR in the subset of CBRs.

Aspect 13: The method of Aspect 11, wherein selecting the subset of CBRs comprises selecting the subset of CBRs based at least in part on one or more of estimated distances or pathloss values associated with the plurality of Rx UEs.

Aspect 14: The method of Aspect 11, wherein selecting the subset of CBRs comprises selecting the subset of CBRs based at least in part on zone identifiers associated with the plurality of Rx UEs.

Aspect 15: The method of any of Aspects 1 through 14, wherein combining the CBRs to obtain the combined CBR comprises combining the CBRs based at least in part on an arithmetic average or a weighted average of the CBRs.

Aspect 16: The method of any of Aspects 1 through 15, wherein combining the CBRs to obtain the combined CBR comprises: ranking the CBRs in an order; selecting, from the CBRs ranked in the order, a subset of CBRs; and calculating an average value from the subset of CBRs, wherein the average value is an arithmetic average value or a weighted average value.

Aspect 17: The method of Aspect 16, wherein the order is a descending order, and the subset of CBRs corresponds to a quantity of highest CBRs in the CBRs associated with the plurality of Rx UEs.

Aspect 18: The method of Aspect 16, wherein the order is an ascending order, and the subset of CBRs corresponds to a quantity of lowest CBRs in the CBRs associated with the plurality of Rx UEs.

Aspect 19: The method of any of Aspects 1 through 18, wherein: receiving the indications of CBRs from the plurality of Rx UEs comprises receiving the indications of CBRs from different clusters of Rx UEs; and combining the CBRs to obtain the combined CBR comprises: calculating an average value for each cluster of Rx UEs in the different clusters of Rx UEs, wherein the average value is an arithmetic average value or a weighted average value; and determining the combined CBR based at least in part on the average value for each cluster of Rx UEs in the different clusters of Rx UEs.

Aspect 20: The method of any of Aspects 1 through 19, wherein combining the CBRs to obtain the combined CBR associated with the Tx UE comprises combining the CBRs based at least in part on one or more of: a latency requirement of a packet to be transmitted; a priority of the packet; a remaining packet delay budget of the packet; a utilization of hybrid automatic repeat request acknowledgements versus blind transmissions by the Tx UE; a cast type; a reliability requirement of a communication session; a utilization of power control by the Tx UE; or a communication range.

Aspect 21: The method of any of Aspects 1 through 20, further comprising: filtering the CBRs based at least in part on a beam index.

Aspect 22: The method of any of Aspects 1 through 21, wherein combining the CBRs comprises combining the CBRs received from the plurality of Rx UEs with CBR measurements performed by the Tx UE at CBR measurement occasions to obtain the combined CBR associated with the Tx UE.

Aspect 23: The method of any of Aspects 1 through 22, wherein combining the CBRs comprises combining the CBRs per resource pool or per bandwidth part.

Aspect 24: The method of any of Aspects 1 through 23, wherein combining the CBRs comprises combining the CBRs associated with an active component carrier or a plurality of component carriers when the Tx UE is configured with sidelink carrier aggregation.

Aspect 25: An apparatus for wireless communications at a Tx UE, comprising a processor; memory coupled to the processor; and instructions stored in the memory and executable by the processor to cause the apparatus to perform a method of any of Aspects 1 through 24.

Aspect 26: A non-transitory computer-readable medium storing one or more instructions for wireless communication at a Tx UE, the one or more instructions executable by a processor to perform a method of any of Aspects 1 through 24.

Aspect 27: An apparatus for wireless communication at a Tx UE, comprising at least one means for performing a method of any Aspects 1 through 24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a transmitting (Tx) user equipment (UE), comprising:
   a memory; and
   one or more processors coupled to the memory, the one or more processors, individually or collectively, configured to:
      receive, from a plurality of receiving (Rx) UEs, indications of channel busy ratios (CBRs) associated with the plurality of Rx UEs, respectively;
      combine the CBRs to obtain a combined CBR associated with the Tx UE, by selecting a subset of CBRs from the CBRs associated with the plurality of Rx UEs based at least in part on one of:
         signal measurements associated with each CBR in the subset of CBRs,
         one or more of estimated distances or pathloss values associated with the plurality of Rx UEs, or
         zone identifiers associated with the plurality of Rx UEs,
      wherein the combined CBR associated with the Tx UE is based at least in part on the subset of CBRs; and
      adjust a resource utilization based at least in part on the combined CBR associated with the Tx UE.

2. The apparatus of claim 1, wherein the one or more processors, to receive the indications of CBRs, are configured to:
   receive at least one indication of a CBR from an Rx UE via a sidelink interface between the Tx UE and the Rx UE;
   receive the indications of CBRs via broadcasts from the plurality of Rx UEs;
   receive the indications of CBRs in slots that precede or succeed reporting slots associated with the Tx UE; or
   receive the indications of CBRs in slots that correspond to reporting slots associated with the Tx UE.

3. The apparatus of claim 1, wherein the indications of CBRs are included in inter-UE coordination reports.

4. The apparatus of claim 1, wherein the one or more processors are further configured to:
   receive, from a network entity, a configuration that defines a plurality of slots for receiving the indications of CBRs.

5. The apparatus of claim 4, wherein:
   the configuration limits a maximum quantity of inter-UE coordination reports with CBRs to be received from the plurality of Rx UEs;
   the configuration is based at least in part on a capability of the Tx UE; or
   the plurality of slots satisfy a threshold level that enables the Tx UE to periodically enter a power saving mode.

6. The apparatus of claim 1, wherein the one or more processors, to combine the CBRs to obtain the combined CBR, are configured to combine the CBRs based at least in part on an arithmetic average or a weighted average of the CBRs.

7. An apparatus for wireless communication at a transmitting (Tx) user equipment (UE), comprising:
   a memory; and
   one or more processors coupled to the memory, the one or more processors, individually or collectively, configured to:
      receive, from a plurality of receiving (Rx) UEs, indications of channel busy ratios (CBRs) associated with the plurality of Rx UEs, respectively;
      combine the CBRs to obtain a combined CBR associated with the Tx UE, by:
         ranking the CBRs in an order;
         selecting, from the CBRs ranked in the order, a subset of CBRs; and
         calculating an average value from the subset of CBRs, wherein the average value is an arithmetic average value or a weighted average value; and
      adjust a resource utilization based at least in part on the combined CBR associated with the Tx UE.

8. The apparatus of claim 7, wherein:
   the order is a descending order, and the subset of CBRs corresponds to a quantity of highest CBRs in the CBRs associated with the plurality of Rx UEs; or
   the order is an ascending order, and the subset of CBRs corresponds to a quantity of lowest CBRs in the CBRs associated with the plurality of Rx UEs.

9. The apparatus of claim 1, wherein:
   the one or more processors, to receive the indications of CBRs from the plurality of Rx UEs, are configured to receive the indications of CBRs from different clusters of Rx UEs; and
   the one or more processors, to combine the CBRs to obtain the combined CBR, are configured to:
      calculate an average value for each cluster of Rx UEs in the different clusters of Rx UEs, wherein the average value is an arithmetic average value or a weighted average value; and
      determine the combined CBR based at least in part on the average value for each cluster of Rx UEs in the different clusters of Rx UEs.

10. An apparatus for wireless communication at a transmitting (Tx) user equipment (UE), comprising:
    a memory; and one or more processors coupled to the memory, the one or more processors, individually or collectively, configured to:
receive, from a plurality of receiving (Rx) UEs, indications of channel busy ratios (CBRs) associated with the plurality of Rx UEs, respectively;
combine the CBRs to obtain a combined CBR associated with the Tx UE based at least in part on one or more of:
a latency requirement of a packet to be transmitted;
a priority of the packet;
a remaining packet delay budget of the packet;
a utilization of hybrid automatic repeat request acknowledgements versus blind transmissions by the Tx UE;
a cast type;
a reliability requirement of a communication session;
a utilization of power control by the Tx UE; or
a communication range; and
adjust a resource utilization based at least in part on the combined CBR associated with the Tx UE.

11. An apparatus for wireless communication at a transmitting (Tx) user equipment (UE), comprising:
a memory; and
one or more processors coupled to the memory, the one or more processors, individually or collectively, configured to:
receive, from a plurality of receiving (Rx) UEs, indications of channel busy ratios (CBRs) associated with the plurality of Rx UEs, respectively;
filter the CBRs based at least in part on a beam index;
combine the CBRs to obtain a combined CBR associated with the Tx UE; and
adjust a resource utilization based at least in part on the combined CBR associated with the Tx UE.

12. The apparatus of claim 1, wherein the one or more processors, to combine the CBRs, are configured to:
combine the CBRs received from the plurality of Rx UEs with CBR measurements performed by the Tx UE at CBR measurement occasions to obtain the combined CBR associated with the Tx UE;
combine the CBRs per resource pool or per bandwidth part; or
combine the CBRs associated with an active component carrier or a plurality of component carriers when the Tx UE is configured with sidelink carrier aggregation.

13. A method of wireless communication performed by a transmitting (Tx) user equipment (UE), comprising:
receiving, from a plurality of receiving (Rx) UEs, indications of channel busy ratios (CBRs) associated with the plurality of Rx UEs, respectively;
combining the CBRs to obtain a combined CBR associated with the Tx UE comprising selecting a subset of CBRs from the CBRs associated with the plurality of Rx UEs based at least in part on one of:
signal measurements associated with each CBR in the subset of CBRs,
one or more of estimated distances or pathloss values associated with the plurality of Rx UEs, or
zone identifiers associated with the plurality of Rx UEs,
wherein the combined CBR associated with the Tx UE is based at least in part on the subset of CBRs; and
adjusting a resource utilization based at least in part on the combined CBR associated with the Tx UE.

14. The method of claim 13, wherein receiving the indications of CBRs comprises:
receiving at least one indication of a CBR from an Rx UE via a sidelink interface between the Tx UE and the Rx UE;
receiving the indications of CBRs via broadcasts from the plurality of Rx UEs;
receiving the indications of CBRs in slots that precede or succeed reporting slots associated with the Tx UE; or
receiving the indications of CBRs in slots that correspond to reporting slots associated with the Tx UE.

15. The method of claim 13, wherein the indications of CBRs are included in inter-UE coordination reports.

16. The method of claim 13, further comprising:
receiving, from a network entity, a configuration that defines a plurality of slots for receiving the indications of CBRs.

17. The method of claim 16, wherein:
the configuration limits a maximum quantity of inter-UE coordination reports with CBRs to be received from the plurality of Rx UEs;
the configuration is based at least in part on a capability of the Tx UE; or
the plurality of slots satisfy a threshold level that enables the Tx UE to periodically enter a power saving mode.

18. The method of claim 13, wherein combining the CBRs to obtain the combined CBR comprises combining the CBRs based at least in part on an arithmetic average or a weighted average of the CBRs.

19. A method of wireless communication performed by a transmitting (Tx) user equipment (UE), comprising:
receiving, from a plurality of receiving (Rx) UEs, indications of channel busy ratios (CBRs) associated with the plurality of Rx UEs, respectively;
combining the CBRs to obtain a combined CBR associated with the Tx UE, comprising:
ranking the CBRs in an order;
selecting, from the CBRs ranked in the order, a subset of CBRs; and
calculating an average value from the subset of CBRs, wherein the average value is an arithmetic average value or a weighted average value; and
adjusting a resource utilization based at least in part on the combined CBR associated with the Tx UE.

20. The method of claim 19, wherein:
the order is a descending order, and the subset of CBRs corresponds to a quantity of highest CBRs in the CBRs associated with the plurality of Rx UEs; or
the order is an ascending order, and the subset of CBRs corresponds to a quantity of lowest CBRs in the CBRs associated with the plurality of Rx UEs.

21. The method of claim 13, wherein:
receiving the indications of CBRs from the plurality of Rx UEs comprises receiving the indications of CBRs from different clusters of Rx UEs; and
combining the CBRs to obtain the combined CBR comprises:
calculating an average value for each cluster of Rx UEs in the different clusters of Rx UEs, wherein the average value is an arithmetic average value or a weighted average value; and
determining the combined CBR based at least in part on the average value for each cluster of Rx UEs in the different clusters of Rx UEs.

22. A method of wireless communication performed by a transmitting (Tx) user equipment (UE), comprising:
receiving, from a plurality of receiving (Rx) UEs, indications of channel busy ratios (CBRs) associated with the plurality of Rx UEs, respectively;

combining the CBRs to obtain a combined CBR associated with the Tx UE based at least in part on one or more of:
　　a latency requirement of a packet to be transmitted;
　　a priority of the packet;
　　a remaining packet delay budget of the packet;
　　a utilization of hybrid automatic repeat request acknowledgements versus blind transmissions by the Tx UE;
　　a cast type;
　　a reliability requirement of a communication session;
　　a utilization of power control by the Tx UE; or
　　a communication range; and
adjusting a resource utilization based at least in part on the combined CBR associated with the Tx UE.

23. A method of wireless communication performed by a transmitting (Tx) user equipment (UE), comprising:
　receiving, from a plurality of receiving (Rx) UEs, indications of channel busy ratios (CBRs) associated with the plurality of Rx UEs, respectively;
　filtering the CBRs based at least in part on a beam index;
　combining the CBRs to obtain a combined CBR associated with the Tx UE; and
　adjusting a resource utilization based at least in part on the combined CBR associated with the Tx UE.

24. The method of claim 13, wherein combining the CBRs comprises:
　combining the CBRs received from the plurality of Rx UEs with CBR measurements performed by the Tx UE at CBR measurement occasions to obtain the combined CBR associated with the Tx UE;
　combining the CBRs per resource pool or per bandwidth part; or
　combining the CBRs associated with an active component carrier or a plurality of component carriers when the Tx UE is configured with sidelink carrier aggregation.

25. A non-transitory computer-readable medium storing a set of instructions for wireless communication, the set of instructions comprising:
　one or more instructions that, when executed by one or more processors of a transmitting (Tx) user equipment (UE), cause the Tx UE to:
　　receive, from a plurality of receiving (Rx) UEs, indications of channel busy ratios (CBRs) associated with the plurality of Rx UEs, respectively;
　　combine the CBRs to obtain a combined CBR associated with the Tx UE, by selecting a subset of CBRs from the CBRs associated with the plurality of Rx UEs based at least in part on one of:
　　　signal measurements associated with each CBR in the subset of CBRs,
　　　one or more of estimated distances or pathloss values associated with the plurality of Rx UEs, or
　　　zone identifiers associated with the plurality of Rx UEs,
　　wherein the combined CBR associated with the Tx UE is based at least in part on the subset of CBRs; and
　　adjust a resource utilization based at least in part on the combined CBR associated with the Tx UE.

26. A transmitting (Tx) apparatus for wireless communication, comprising:
　means for receiving, from a plurality of receiving (Rx) apparatuses, indications of channel busy ratios (CBRs) associated with the plurality of Rx apparatuses, respectively;
　means for combining the CBRs to obtain a combined CBR associated with the Tx apparatus, by selecting a subset of CBRs from the CBRs associated with the plurality of Rx UEs based at least in part on one of:
　　signal measurements associated with each CBR in the subset of CBRs,
　　one or more of estimated distances or pathloss values associated with the plurality of Rx UEs, or
　　zone identifiers associated with the plurality of Rx UEs,
　wherein the combined CBR associated with the Tx UE is based at least in part on the subset of CBRs; and
　means for adjusting a resource utilization based at least in part on the combined CBR associated with the Tx apparatus.

* * * * *